United States Patent [19]

Tueker et al.

[11] Patent Number: 5,380,563
[45] Date of Patent: Jan. 10, 1995

[54] CERAMIC WELDING

[75] Inventors: Leslie E.J. Tueker, Evesham; Kevin Dunderdale, Leeds; David K. Hurran, Cheltenham; Robert G. Everitt, Tewkesbury, all of England

[73] Assignee: Coal Industry (Patents) Limited, London, United Kingdom

[21] Appl. No.: 899,679

[22] Filed: Jun. 17, 1992

[30] Foreign Application Priority Data

Jun. 20, 1991 [GB] United Kingdom ............... 9113365
Jun. 20, 1991 [GB] United Kingdom ............... 9113370

[51] Int. Cl.⁶ .............................................. B05D 3/04
[52] U.S. Cl. ..................................... 427/452; 427/453
[58] Field of Search ..................... 427/452, 453, 140

[56] References Cited

U.S. PATENT DOCUMENTS 5,013,499  5/1991  Willard .......................... 427/452 X
5,061,526 10/1991  Robyn et al. ................... 427/453 X

FOREIGN PATENT DOCUMENTS 102083   7/1941  Sweden .
402203  11/1933  United Kingdom .
1125954  9/1968  United Kingdom .
1330894  9/1973  United Kingdom .
2035524  8/1982  United Kingdom .
2110200  6/1983  United Kingdom .
2154228  9/1985  United Kingdom .
2170191  7/1986  United Kingdom .
2190671 11/1987  United Kingdom .
2213812  8/1989  United Kingdom .
2233323  1/1991  United Kingdom .

*Primary Examiner*—Shrive Beck
*Assistant Examiner*—Benjamin L. Utech
*Attorney, Agent, or Firm*—Stevens, Davis, Miller & Mosher

[57] ABSTRACT

In a ceramic welding process a composition of matter therefore includes a mixture of refractory particles and oxidizable metal particles wherein the harmonic mean size of the refractory particles is between 300 and 1000 microns, and the size range spread factor of the refractory particles is between 0.4 and 1.1 inclusive.

8 Claims, No Drawings

CERAMIC WELDING

BACKGROUND OF THE INVENTION

This invention concerns improvements in or relating to ceramic welding processes and in particular has reference to the size characteristics of the powder elements of the composition of matter employed in such processes.

The present invention also has reference to an improved composition of matter for use in ceramic welding processes.

Such processes are well established for repairing the internal refractory structures of coke ovens, glass furnaces and the like and are disclosed for example in British Patents Nos. 402 203, 1 330 894 and 2 035 524 and Swedish Patent No. 102 283. A ceramic welding process usually involves the conveyance in a carrier gas of a composition of matter in the form of a mixture of powders to a lance, the powder particles being entrained within the lance in an oxygen-containing gas and projected from the lance to a surface where a part of the powder mixture reacts exothermically with oxygen to cause at least partial fusion of the other part of the powder mixture, both with itself and with the surface, so that a ceramic weld is formed.

A composition of matter suitable for use in a ceramic welding process is typically a mixture of refractory oxide and metal and/or metalloid particles in powder form. A composition of matter and process for use in forming refractory masses by a ceramic welding process are disclosed in British Patents Nos. 2 154 228, 2 110 200 and 2 170 191.

British Patent No. 2 170 191 specifies the size characteristics of the refractory particles and the oxidisable motal particles by various properties including one term which approximates to average size and another term which relates to size distribution. The language of the principal claims of 2 170 191 can be simplified by translation into more readily understandable expression to convey the meaning that the average size of the refractory particles must be greater than the average size of the oxidizable particles and that the spread of sizes of the refractory particles should be above a certain minimum. The former of these two requirements is plainly obvious and merely reproduces the disclosures of earlier patents in the ceramic welding field, for example British Patent No. 1 330 894 which gives maximum average sizes for refractories and oxidizable particles as 500 microns and 50 microns respectively. A wide distribution of sizes, giving a high size range spread, is said in 2 170 191 to be of benefit in that it contributes to the formation of durable welds which are less porous and contain less cracks than welds produced using refractory particles of more homogeneous size distribution.

In view of the benefits said to be derived from the operation of the process and use of a composition of matter as defined in British Patent No. 2 170 191, we have found, surprisingly, that high quality, durable refractory masses can be formed by employing refractory particles of more uniform size distribution than is suggested to be the case by this earlier patent. Moreover, the removal of the coarse fractions of the refractory particles assists the flow of the composition of matter through the transport system, enables smoother finish to the resultant weld to be achieved and reduces the proportion of conveyed material which does not form part of the weld. The elimination of the fine size fractions of the refractory particles is also beneficial in aiding the flow of matter, but has added benefits in regard to reducing the extent of silica dust which becomes airborne during handling, to reducing the dust cloud at the reaction zone and hence to reducing the proportion of conveyed material which does not form part of the weld, and to enhancing the exothermic reactions of the oxidizable particles by not stifling these reactions in a similar manner to stone dust which is used in extinguishing fires in underground mines.

The earlier British Patents Nos. 2 154 228 and 2 110 200 describe compositions of matter consisting of incombustible refractory material and particles of exothermically oxidizable material which latter have a characteristic average size of below 50 microns and comprising silicon and aluminium, the aluminium being present in an amount up to 12% by weight of the total mixture. Claim 8 of British Patent No. 2 154 228 prescribes the aluminium content as being at least 1% by weight of the total mixture. In the Examples of these patents, mixtures of silicon and aluminium are described as being used with refractory oxide particles comprising one or more of the following namely zirconia, magnesia, alumina, silica, sillimanite and mullite. It is a feature of all the aforementioned patents that a suitable choice of refractory particles can be made to give a weld repair composition which is as close as possible to that of the substrate refractory to be treated when this is desired.

The ceramic welding process is widely used in the repair of coke ovens the linings of which are formed from silica refractory blocks. Conventionally, the composition of matter, is the welding powder, comprises a mixture of aluminium, silicon and silica particles, and Example VIII of British Patent No. 2 154 228 gives a composition of matter for the repair of a coking furnace as comprising 1% aluminium, 12% silicon and 87% silica (% by weight). (It is to be noted that the Example in question actually quotes 80% silica but it is believed to be an erratum).

In coke ovens, the silica refractory blocks are not 100% pure silica and contain inter alia small quantities of aluminium, iron and calcium impurities present in complex refractory oxide molecules. Furthermore, the silica is present in the crystalline forms tridymite and oristobalite. The preferred silica component of the welding powder is crushed silica refractory of the same crystalline and chemical form as indicated above.

Use of a welding powder mixture comprising aluminium in an amount of at least 1% by weight of the total mixture, silicon and crushed silica refractory cannot always produce a weld composition which matches exactly the composition of the silica substrate. The chemical mismatch is compounded by the fact that a certain proportion of the applied welding powder mixture is lost at the periphery of the spray of material projected from the lance, and does not form part of the final weld since it is not accommodated within the hot zone at the repair area. The lost material is essentially refractory and thus the use of aluminium, particularly in amounts of at least 1%, in the welding powder, results in significantly higher quantities of aluminium as an oxide in the weld repair per se than is present in the substrate refractory silica brick.

Furthermore, it has been found that welds formed from powder mixtures of aluminium, silicon and silica may contain a proportion of silicon metal which is considered at least by some skilled in the art to be detrimental to the quality and durability of the resultant weld, and hence to the efficacy of the process as a whole.

It is also to be noted that when repairing coke ovens the temperature of the refractory can be 800° C. at the ends and possibly 1200° C. and in excess thereof at the centre of the oven. While it may be the case that the use of aluminium in the welding powder mixture can promote good initiation of the weld at lower temperature, it can lead to high and undesirable reaction rates at relatively higher temperatures, namely 1200° C. and above, thereby resulting in overheating of the reaction zone magma layer which becomes low in viscosity and flows easily. When this phenomenon occurs, correct application of the weld becomes difficult since the forward velocity of the projected welding powder forces the magma layer to spread and distort at the periphery, thus producing poor quality welds which are porous and have an uneven finished surface.

SUMMARY OF THE INVENTION

One object of the present invention is to provide an improved ceramic welding process and a composition of matter therefor.

A further object of the present invention is to provide a composition of matter for use in a ceramic welding process which affords a better chemical match between the weld repair and the substrate refractory.

A still further object of the present invention is to provide a composition of matter for use in a ceramic welding process which can be used at relatively high temperatures, for example a substrate temperature of at least 800° C., without giving rise to the disadvantage of distortion and poor quality welds occasioned by the use of compositions containing aluminium.

DETAILED DESCRIPTION OF THE INVENTION

According to a first aspect of the invention there is provided a ceramic welding process in which a composition of matter comprising a mixture of refractory particles and oxidizable metal particles is projected with an oxygen-containing gas through a lance to a surface where oxidizable particles react exothermally to cause at least partial fusion of the other particles of the mixture, both with themselves and with the surface, so that a ceramic weld is formed, characterized in that the harmonic mean size (as defined herein) of the refractory particles is between 300 and 1000 microns inclusive, and the size range spread factor (as defined herein) of the refractory particles is between 0.4 and 1.1 inclusive.

The harmonic mean size is defined as $$\frac{W_i}{(W_i/S_i)}$$

where $W_i$ is the weight or percentage of material in the $i^{th}$ size fraction and $S_i$ is the mean size of the $i^{th}$ fraction.

The size range spread factor is defined as follows:

$$F(G) = \frac{2(G_{80} - G_{20})}{G_{80} + G_{20}}$$

where $G_{80}$ denotes the 80% grain size of the refractory particles and $G_{20}$ denotes the 20% grain size of the refractory particles and "% grain size" is used to denote the % proportion by weight of refractory particles which will pass a screen having a mesh of that size.

The harmonic mean size is a useful term to adopt to describe particle size distributions since it is widely known and in processes such as ceramic welding where the chemical reactions are surface dependent, the harmonic mean size is relevant in that it is defined as the diameter of a particle of average surface area.

It is common general knowledge that the oxidizable metal particles should be fine in order to promote their reaction with oxygen. In practice, commercially available metal particles of this kind with a maximum size of 125 microns (but with a size distribution down to submicron size) are commonly used and are very satisfactory.

According to a second aspect of the invention there is provided a composition of matter for a ceramic welding process, the composition comprising a mixture of refractory particles and oxidizable metal particles characterized in that the harmonic mean size as defined herein of the refractory particles is between 300 and 1000 microns inclusive, and preferably between 400 and 700 microns inclusive, and the size range spread factor as defined herein of the refractory particles is between 0.4 and 1.1 inclusive.

Preferably the composition comprises a mixture of refractory oxide particles and silicon powder, the silicon being the only component of the mixture in elemental form.

The refractory oxides which can be used in the invention are preferably silica. The silicon powder may be present in the composition of matter in an amount of at least 10% up to 18% by weight of the total composition. Preferably, the silicon powder is present in the composition of matter in an amount of from 12% to 16% inclusive by weight of the total composition.

A ceramic welding process and a composition of matter according to the invention are now illustrated by the following Examples.

EXAMPLE 1

A composition of matter comprising a mixture was prepared with 84% by weight of crushed silica refractory and 16% by weight silicon powder in elemental form. The particle sizes of the refractory were 2 mm maximum, 250 microns minimum and 750 micron average. The refractory had a harmonic mean size of 600 microns and a size range spread factor of 0.95. The silicon was of 125 microns maximum size and an average size of 26 microns.

The mixture was sprayed onto silica refractory brick at 1000° C. using a machine and method essentially as described in British Patent No. 2 173 715. Powder was delivered at 60 kg/hr using an oxidizing gas flow of 550 NL/min and an air/oxygen ratio of 1:2. The powder was ejected through a nozzle of 19 mm diameter, the nozzle being positioned 75-100 mm from the substrate refractory.

The mixture auto-ignited and produced a good weld which was firmly adhered to the substrate and which had similar physical and chemical characteristics as the substrate.

Chemical analyses of the weld gave an alumina content of 2.1% which compares with a typical value of 1.5-2% in the host brick.

For comparative purposes, a powder mixture containing by weight 82.5% crushed silica refractory, 16% silicon in elemental form and 1.5% aluminium was prepared and sprayed in the same manner as previously described onto silica refractory brick. The chemical analysis of the resultant weld gave an alumina content of 5.7%, representing a not inconsiderable divergence from the 1.5–2% value of the host brick alumina component.

Determination of the free elemental silicon of the two welds showed that the content of the resultant weld using the composition of matter of the present invention was only half that in the weld resulting from the comparative test.

EXAMPLE 2

A composition of matter was prepared as in Example 1 but with the mixture containing 14% by weight of silicon in elemental form, and 86% by weight of crushed silica refractory; in all other respects the mixture was identical to that of Example 1.

Again the mixture was sprayed onto silica refractory brick under the same conditions and again the resultant weld and the host substrate displayed similar alumina contents to those given in Example 1 above. Furthermore, the elemental silicon content of the weld formed with the composition of matter of the invention was significantly lower than when using the prior art formulations.

EXAMPLE 3

The experiment of Example 1 was repeated but with a composition of matter comprising a mixture of refractory particles sized between 1 mm and 250 microns to give an harmonic means size of 400 microns and a size range spread factor of 0.6. Again, the welding operation was easy to initiate and control, and a good dense durable weld was formed.

EXAMPLE 4

Further experimentation using the compositions of matter set forth in the previous Examples was conducted at different temperatures, namely at 800° C., 900° C. and 1200° C. Additionally, tests were carried out at a coke works to establish actual working conditions for the new formulations of the present invention. In all cases, the further investigative activity gave beneficial results in terms of ready powder ignition, ease of welding, and welds of good quality.

We claim:

1. A ceramic welding process comprising projecting through a lance an oxygen containing gas and a composition of matter comprising a mixture of refractory particles and oxidizable metal particles to a ceramic surface to be welded where said oxidizable particles react exothermally to cause at least partial fusion of the refractory particles of the mixture, both with themselves and with the surface, so that a ceramic weld is formed, wherein the harmonic mean size of the refractory particles is between 300 and 1000 microns inclusive, and the size range spread factor of the refractory particles is between 0.4 and 1.1 inclusive.

2. A process according to claim 1 in which the harmonic mean size is between 400 and 700 microns inclusive.

3. A process according to claim 1 in which the size range spread factor is between 0.5 and 1.0 inclusive.

4. A process according to claim 1 in which the composition of matter comprises a mixture of refractory oxide particles and silicon powder, the silicon being the only component of the mixture in elemental form.

5. A process according to claim 4 in which the silicon powder is present in the mixture in the range of 10–18% inclusive by weight of the total mixture.

6. A process according to claim 5 in which the silicon powder is present in the mixture in the range of 12–16% inclusive by weight of the total mixture.

7. A process according to claim 4 in which the maximum size of the silicon is below 125 microns.

8. A process according to claim 4 in which the refractory particles comprise crushed silica particles.

* * * * *

UNITED STATES PATENT AND TRADEMARK OFFICE
CERTIFICATE OF CORRECTION

PATENT NO. : 5,380,563
DATED : January 10, 1995
INVENTOR(S) : Leslie E.J. TUCKER et al It is certified that error appears in the above-indentified patent and that said Letters Patent is hereby corrected as shown below:

Column 3, lines 52-55, the formula should read:

$$-- \frac{\Sigma \; W_i}{\Sigma \; (W_i/S_i)} \;\; --$$

Signed and Sealed this

Twentieth Day of June, 1995

Attest:

BRUCE LEHMAN

Attesting Officer

Commissioner of Patents and Trademarks